United States Patent
Li et al.

(10) Patent No.: US 9,514,019 B2
(45) Date of Patent: Dec. 6, 2016

(54) METHOD IN A SERIAL COMMUNICATION

(75) Inventors: Xinyu Li, Shenzhen (CN); Shuang Zhang, Shenzhen (CN)

(73) Assignee: Nokia Technologies Oy, Espoo (FI)

( * ) Notice: Subject to any disclaimer, the term of this patent is extended or adjusted under 35 U.S.C. 154(b) by 154 days.

(21) Appl. No.: 14/367,852

(22) PCT Filed: Dec. 23, 2011

(86) PCT No.: PCT/CN2011/084531
§ 371 (c)(1),
(2), (4) Date: Jun. 20, 2014

(87) PCT Pub. No.: WO2013/091237
PCT Pub. Date: Jun. 27, 2013

(65) Prior Publication Data
US 2015/0324270 A1   Nov. 12, 2015

(51) Int. Cl.
*G06F 3/00* (2006.01)
*G06F 13/36* (2006.01)
(Continued)

(52) U.S. Cl.
CPC ....... *G06F 11/3055* (2013.01); *G06F 11/3041* (2013.01); *G06F 13/102* (2013.01);
(Continued)

(58) Field of Classification Search
CPC .................................. G06F 1/00; G06F 11/30
(Continued)

(56) References Cited

U.S. PATENT DOCUMENTS 6,175,887 B1    1/2001  Ervin et al.
6,996,626 B1 *  2/2006  Smith ..................... H04L 65/80
                                                 370/352
(Continued)

FOREIGN PATENT DOCUMENTS

CN    1633645    6/2005
CN    1894681    1/2007
(Continued)

OTHER PUBLICATIONS

International Search Report received for corresponding Patent Cooperation Treaty Application No. PCT/CN2011/084531, dated Oct. 12, 2012, 3 pages.
(Continued)

*Primary Examiner* — Idriss N Alrobaye
*Assistant Examiner* — Getente A Yimer
(74) *Attorney, Agent, or Firm* — Harrington & Smith

(57) ABSTRACT

There is disclosed a method in which a status of a first contact and a status of a second contact are detected. At least one of the detected statuses are used to determine whether the first contact is free for transferring data. If the determining indicates that the data connection is free for transferring data, a first arbitration delay is waited before the status of the first contact and the status of the second contact are again detected. A transmission of a start bit is then started if the detected status of the first contact and the detected status of the second contact indicate that the first contact is still free for transferring data. There is also disclosed an apparatus and a storage medium having stored thereon a computer executable program code for use by an apparatus to implement the method.

20 Claims, 8 Drawing Sheets

(51) Int. Cl.
- *G06F 13/372* (2006.01)
- *G06F 11/30* (2006.01)
- *G06F 13/10* (2006.01)
- *H04L 12/413* (2006.01)
- *G06F 13/42* (2006.01)
- *G06F 1/00* (2006.01)

(52) U.S. Cl.
CPC ........ G06F 13/4291 (2013.01); H04L 12/413 (2013.01); *G06F 1/00* (2013.01); *G06F 11/30* (2013.01); *Y02B 60/1228* (2013.01); *Y02B 60/1235* (2013.01)

(58) Field of Classification Search
USPC ..................................... 710/17, 15, 118, 125
See application file for complete search history.

(56) References Cited

U.S. PATENT DOCUMENTS

| | | | | |
|---|---|---|---|---|
| 2003/0177290 | A1* | 9/2003 | Ayukawa | G06F 3/0601 710/10 |
| 2007/0002748 | A1* | 1/2007 | Nakata | H04L 12/56 370/238 |
| 2007/0180179 | A1* | 8/2007 | Irisa | G06F 13/364 710/307 |
| 2008/0052414 | A1* | 2/2008 | Panigrahi | H04N 21/23439 709/246 |

FOREIGN PATENT DOCUMENTS

| | | |
|---|---|---|
| CN | 1983207 A | 6/2007 |
| CN | 101061679 | 10/2007 |
| EP | 1057303 | 6/2006 |

OTHER PUBLICATIONS

"Bus Arbitration", Embedded Systems AcademyProducts, Consulting & Training for Embedded Systems, Retrieved on Mar. 17, 2016, Webpage available at : http-//www.esacademy.com/en/library/technical-articles-and-documents/miscellaneous/i2c-bus/general-introduotion/bus-arbitration.html.

* cited by examiner

METHOD IN A SERIAL COMMUNICATION

RELATED APPLICATION

This application was originally filed as PCT Application No. PCT/CN2011/084531 filed Dec. 23, 2011.

TECHNICAL FIELD

The present invention relates to a method comprising determining whether a data connection is free for transmission. The present invention also relates to an apparatus comprising at least one processor and at least one memory including computer program code, the at least one memory and the computer program code configured to, with the at least one processor, cause the apparatus to determining whether a data connection is free for transmission The present invention further relates to a computer program product comprising program code for use by an apparatus, said program code comprises instructions for determining whether a data connection is free for transmission.

BACKGROUND INFORMATION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Serial communication can be used between different elements in an apparatus, between different apparatuses etc. to exchange information between elements and/or devices, send/receive commands, data etc. In some embodiments for peer-to-peer communications the serial communication utilizes one data line to send data from a sending peer to a receiving peer and one timing line to provide timing information for the receiving peer so that the receiving peer can examine the status of the data line at correct time instances and correctly obtain the data which the sending peer has transmitted. In some other embodiments there may not be a separate timing line for synchronization but other means may be used instead.

In the following the term communication element relates to a device or an apparatus which is able to communicate with another communication element.

SUMMARY OF SOME EXAMPLE EMBODIMENTS

Communication elements may be elements in the same apparatus or elements in separate apparatuses. For example, the communication element may be a general purpose input/output module (GPIO) in a processor such as a central processing unit (CPU). The apparatuses in which one or more such communication elements may be located can be computers, peripheral devices for the computers, mobile communication equipment, apparatuses of a process control system, etc. The term peer may also be used to describe the communication element.

When two communication elements are connected in a communication connection an arbitration method may be used to determine whether the serial bus is free and the communication element can start data transmission. This may be achieved e.g. by first examining the status of the data line and the timing line and if they both are in a certain state, the communication element assumes that the serial bus is free and data can be transmitted. However, it may occur that two (or more) communication elements simultaneously perform the arbitration and they both (all) may deduce that the serial bus is free for transmission. Thus, two or more communication elements may simultaneously start data transmission which may lead to a collision and both communication elements fail to transmit data.

When communication elements have detected the failure in the communication they may wait a certain time before retrying the transmission. When the time has expired the above described arbitration procedure may be initiated again and still it may occur that two or more communication elements are simultaneously beginning data transmission.

Some examples of connections utilizing one or more serial buses are inter-integrated circuit (IIC, a.k.a. I2C), serial peripheral interface bus (SPI), universal asynchronous receiver/transmitter (UART) and controller area network (CAN). However, these serial apparatuses may require additional controllers inside CPUs, potentially leading to higher cost of the system.

In some example embodiments of the present invention two or more elements may be able to communicate with each other without the need to provide dedicated communication interface circuitry for the elements. The communication may utilize one or more general purpose input/output ports of the elements.

In some embodiments there is provided an arbitration mechanism for starting transmission in which the time between consecutive arbitrations may be different in different communication elements. The time between consecutive arbitrations may also vary in the same communication element so that different arbitration efforts are not always initiated after the same time period.

According to a first aspect of the present invention there is provided a method comprising:
  detecting a status of a first contact;
  detecting a status of a second contact;
  using the detected status of the first contact and the detected status of the second contact to determine whether the first contact is free for transferring data;
  if it is determined that the data connection is free for transferring data, waiting for a first arbitration delay;
  after the first arbitration delay detecting the status of the first contact and detecting the status of the second contact; and
  beginning a transmission of a start bit if the detected status of the first contact and the detected status of the second contact indicate that the first contact is free for transferring data.

According to a second aspect of the present invention there is provided an apparatus comprising a processor and a memory including computer program code, the memory and the computer program code configured to, with the processor, cause the apparatus to:
  detect a status of a first contact;
  detect a status of a second contact;
  use the detected status of the first contact and the detected status of the second contact to determine whether the first contact is free for transferring data;
  wait for a first arbitration delay, if it is determined that the data connection is free for transferring data;
  detect the status of the first contact and detect the status of the second contact after the first arbitration delay; and begin a transmission of a start bit if the detected status of the first contact and the detected status of the second contact indicate that the first contact is free for transferring data.

According to a third aspect of the present invention there is provided a storage medium having stored thereon a computer executable program code for use by an apparatus, said program code comprises instructions for:
  detecting a status of a first contact;
  detecting a status of a second contact;
  using the detected status of the first contact and the detected status of the second contact to determine whether the first contact is free for transferring data;
  if it is determined that the data connection is free for transferring data, waiting for a first arbitration delay;
  after the first arbitration delay detecting the status of the first contact and detecting the status of the second contact; and
  beginning a transmission of a start bit if the detected status of the first contact and the detected status of the second contact indicate that the first contact is free for transferring data.

According to a fourth aspect of the present invention there is provided an apparatus comprising:
  a first detector adapted to detect a status of a first contact;
  a second detector adapted to detect a status of a second contact;
  a determining element adapted to use the detected status of the first contact and the detected status of the second contact to determine whether the first contact is free for transferring data;
  a timer to generate a first arbitration delay when the determining element determined that the data connection is free for transferring data;
  wherein the first detector is adapted to detect the status of the first contact and the second detector is adapted to detect the status of the second contact after the first arbitration delay has elapsed; and
  the apparatus is adapted to begin a transmission of a start bit if the detected status of the first contact and the detected status of the second contact indicated that the first contact is free for transferring data.

According to a fifth aspect of the present invention there is provided an apparatus comprising:
  means for detecting a status of a first contact;
  means for detecting a status of a second contact;
  means for using the detected status of the first contact and the detected status of the second contact to determine whether the first contact is free for transferring data;
  means for waiting for a first arbitration delay, if it is determined that the data connection is free for transferring data;
  wherein the means for detecting the status of the first contact and the means for detecting the status of the second contact are adapted to detect the status of the first contact and the status of the second contact after the first arbitration delay; and
  means for beginning a transmission of a start bit if the detected status of the first contact and the detected status of the second contact indicate that the first contact is free for transferring data.

Some embodiments of the present invention propose a simple method for initiating a communication between two processors or micro controlling units (MCUs) etc. Methods according to some embodiments can be used when there are no common interface peripheral available. Furthermore, this kind of interface peripheral may not be needed in a system chip when utilizing some embodiments of the present invention, thus leading to a simpler design, smaller integration size and silicon area compared to some other solutions.

DESCRIPTION OF THE DRAWINGS

In the following the present invention will be described in more detail with reference to the appended drawings in which.

DETAILED DESCRIPTION OF SOME EXAMPLE EMBODIMENTS

Figure 11:
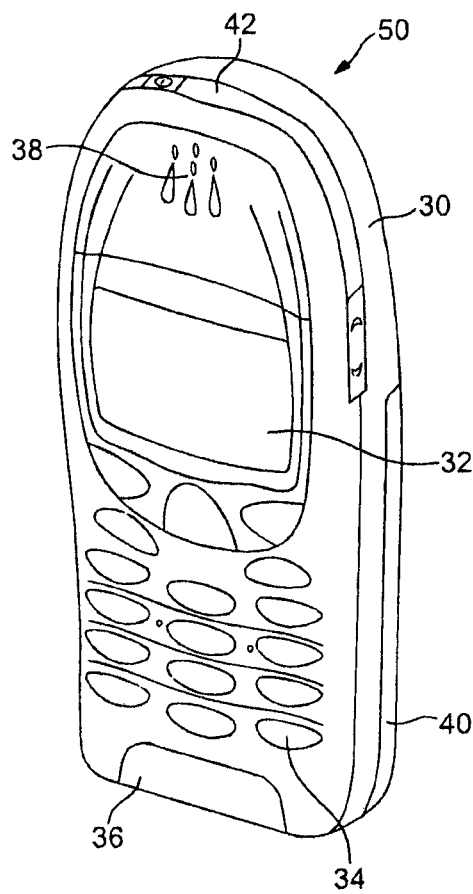
FIG. 11 shows schematically a user equipment suitable for employing some embodiments of the invention.

The following describes in further detail suitable apparatus and possible mechanisms for the provision of improving communication between communication elements utilizing one or more serial buses. In this regard reference is first made to FIG. 11 which shows an example of a user equipment suitable for employing some embodiments of the present invention and FIG. 12 which shows a block diagram of an exemplary apparatus or electronic device 50, which may incorporate an apparatus according to an embodiment of the invention.

The electronic device 50 may for example be a mobile terminal or user equipment of a wireless communication system. However, it would be appreciated that embodiments of the invention may be implemented within any electronic device or apparatus which may require serial communication internally and/or externally.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a universal serial bus (USB)/firewire wired connection.

Figure 12:
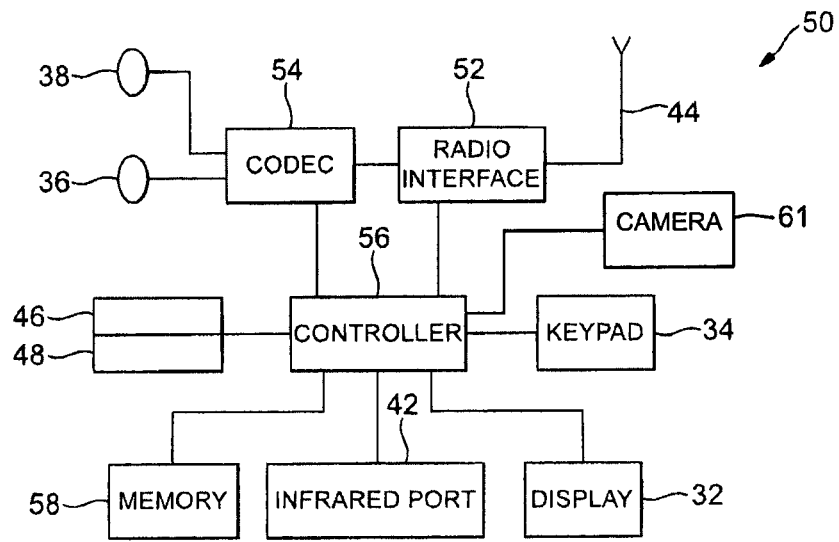
FIG. 12 depicts as a block diagram an apparatus according to an example embodiment of the present invention.

As shown in FIG. 12, the apparatus 50 may comprise one or more controllers 56 or processor for controlling the apparatus 50. The controller 56 may be connected to memory 58 which in embodiments of the invention may store user data and/or other data and/or may also store instructions for implementation on the controller 56. The controller 56 may further be connected to codec circuitry 54 suitable for carrying out coding and decoding of audio and/or video data or assisting in coding and decoding possibly carried out by the controller 56.

The apparatus 50 may further comprise a card reader 48 and a smart card 46, for example a universal integrated circuit card (UICC) and a universal integrated circuit card reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 61 capable of recording or detecting individual frames which are then passed to the codec 54 or controller for processing. In some embodiments of the invention, the apparatus may receive the image data for processing from another device prior to transmission and/or storage. In some embodiments of the invention, the apparatus 50 may receive either wirelessly or by a wired connection the image for processing.

Figure 13:
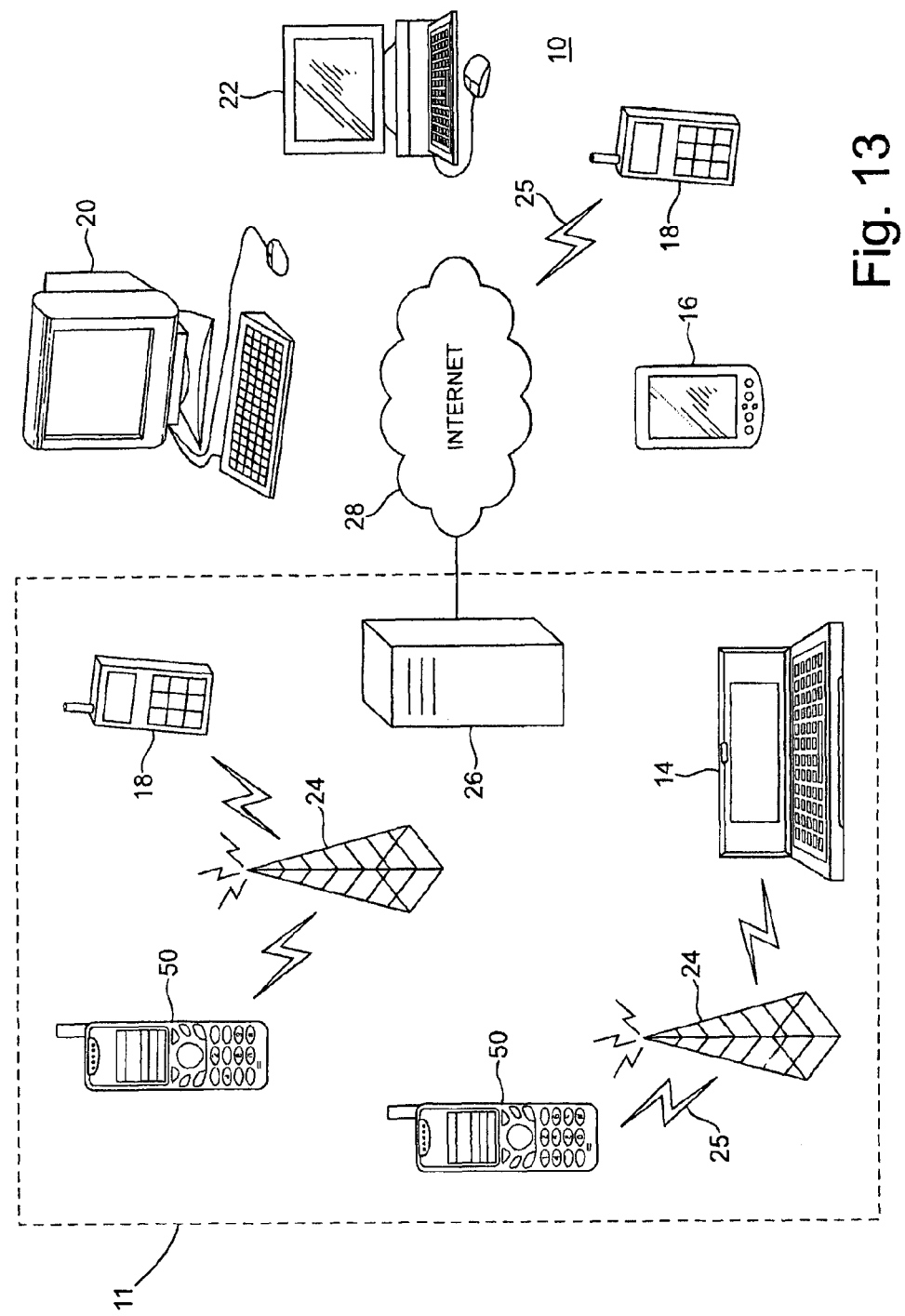
FIG. 13 further shows schematically electronic devices employing embodiments of the invention connected using wireless and wired network connections.

With respect to FIG. 13, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a Global System for Mobile communications (GSM), a Universal Mobile Telecommunications System (UMTS), a Code Division Multiple Access (CDMA) network etc.), a wireless local area network (WLAN) such as defined by any of the Institute of Electrical and Electronics Engineers (IEEE) 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 13 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 1:
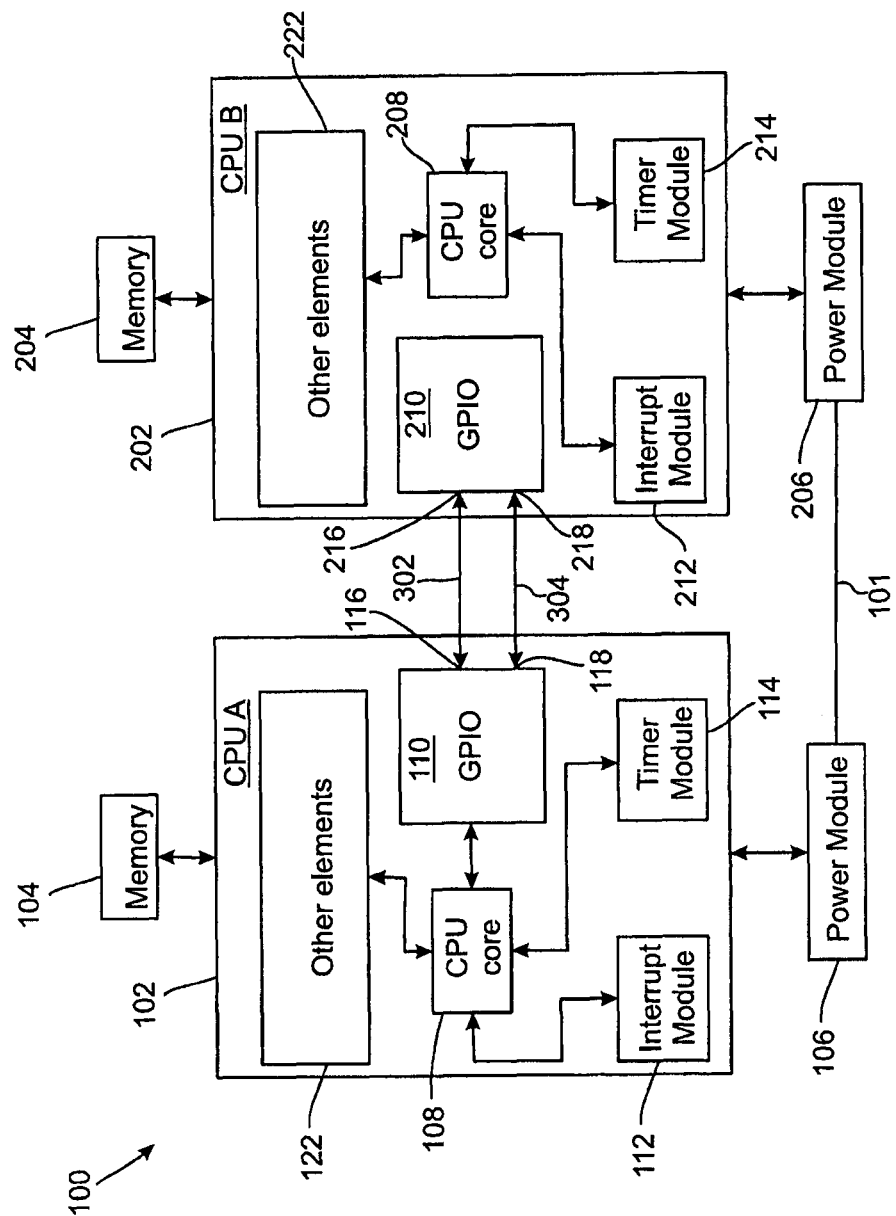
FIG. 1 depicts as a block diagram an example of a system in which two apparatuses are able to communicate with each other using a serial bus.

FIG. 1 depicts an example of a system 100 in which the present invention may be utilized. The system 100 may be a part of the apparatus 50 or another device, or parts of the system may belong to a first apparatus and other parts of the system may belong to another apparatus. For example, the first apparatus may be a computing device such as the desktop computer 20, and the second device may be a peripheral device for the first device. Some non-limiting examples of such peripheral devices are a printer, a scanner, a camera, a memory stick etc.

The system 100 comprises a first controller 102 and a second controller 202. The first controller 102 may be in a data transfer connection with a first memory 104 and, respectively, the second controller 202 may be in a data transfer connection with a second memory 204. Power for the first controller 102 may be provided by a first power module 106 and for the second controller 202 by the second power module 206. There is provided a common power ground connection 101 between the first power module 106 and the second power module 206.

In this example embodiment the first controller 102 has a first CPU core 108 which with appropriate computer code provides the main functionality for the first controller 102. The first controller 102 also has a first input/output element 110 for providing output data contacts for outputting data and input data contacts for inputting data. Some of the data contacts may be bi-directional thus being able to output data and input data. There is also a first interrupt module 112 which takes care of interrupt detections and informs detected interrupts to the first CPU core 108. In some embodiments the interrupt module 112 may perform some tasks when it detects an interrupt thus reducing the work load of the first CPU core 108. There is also a first timer module 114 to provide timing signals for the first CPU core 108.

Correspondingly, the second controller 202 has a second CPU core 208 which with appropriate computer code provides the main functionality for the second controller 202. The second controller 202 also has a second input/output element 210 for providing output data contacts for outputting data and input data contacts for inputting data. Some of the data contacts may be bi-directional thus being able to output data and input data. There is also a second interrupt module 212 which takes care of interrupt detections and informs detected interrupts to the second CPU core 208. In some embodiments also the second interrupt module 212 may perform some tasks when it detects an interrupt. There is further a second timer module 214 to provide timing signals for the second CPU core 208.

The first controller 102 and the second controller 202 may also comprise other elements which are depicted in FIG. 1 as blocks 122 and 222, respectively.

The term contact is intended to describe a connection such as an electric line, a pin of an integrated circuit etc., an optical connection such as an optical waveguide, a fibre etc., or a combination of electric and optical signal transferring means to provide capability to input and/or output signals to/from the controller 102, 202 or another circuitry. In some embodiments the contact may comprise a wire, possibly on a printed circuit board or in an integrated circuit via which electric current is able to flow between entities connected by the wiring. The contact may also comprise a pin of a component such as an integrated circuit.

The first controller 102 and the second controller 202 are arranged in a communication connection by using the first input/output element 110 and the second input/output element 210. This is achieved by using a serial data transfer between the controllers 102, 202. One contact of the first input/output element 110 is arranged for serial data (SDA). This will be called as a first data contact 116 in this description. Another contact of the first input/output element 110 is arranged for timing e.g. for providing a clock signal (SCL). This will be called as a first timing contact 118 in this description. Respectively, one contact of the second input/output element 210 is arranged for serial data and will be called as a second data contact 216 in this description. Another contact of the second input/output element 210 is arranged for timing and will be called as a second timing contact 218 in this description. The first data contact 116 and the second data contact 216 are connected with each other to enable serial data transmission between the first controller 102 and the second controller 202. Correspondingly, the first timing contact 118 and the second timing contact 218 are connected with each other to enable provision of timing data between the first controller 102 and the second controller 202.

The first controller 102 is able to detect the status of the contacts 116 and 118 and the second controller 202 is able to detect the status of the contacts 216 and 218 so that the controllers 102, 202 may deduce whether the serial connection between the controllers 102, 202 is occupied by the other entity or is free for data transmission. The status may be, for example, a logical level 0 or a logical level 1. The logical level 0 may be implemented as a certain voltage level or a current value and the logical level 1 may be implemented as a certain voltage level or a current value different from the voltage level/current value of the logical level 0. In some embodiments the logical level 0 is a voltage value less than 0.8 V and the logical high level is a voltage value higher than 2.4 V. In some other embodiments the logical level 0 may be a voltage value less than 0.5 times the supply voltage (<0.5 Vcc) and the logical 1 level is a voltage value higher than 0.5 times the supply voltage (>0.5 Vcc). However, also other values may be used in different embodiments. In some embodiments the logical 0 level may also be called as a low level and, respectively, the logical 0 level may also be called as a high level.

If the data connection 302 and/or the timing connection 304 between the first controller 102 and the second controller 202 is implemented by using optical signal transferring mechanisms, such as waveguides or optical fibres, the first input/output element 110 may comprise an electro-optical transformer to convert an electric signal into an optical signal and an optical-electric transformer to convert optical signals into electric signals.

In the following the operation of the system 100 is described in more detail with reference to the flow diagrams of FIGS. 9 and 10. When the first controller 102 has data to be transmitted to the second controller 202 the first controller 102 performs an arbitration operation to determine whether the data connection 302 between the controllers 102, 202 is occupied by the other entity or is free for data transmission. The first controller 102 examines the status of the first data contact (SDA) 116 (block 902 in FIG. 9). The status may be examined e.g. by the first CPU core 108 which may read a status register of the first input/output element 110. The status register may contain the logical value of one or more of the inputs and outputs of the first input/output element 110. By examining the value of the status register the first CPU core 108 may be able to determine whether the first data contact 116 is in a logical 1 state or in a logical 0 state. Furthermore, the value of the status register may also reveal whether the first timing contact (SCL) 118 is in a logical 1 state or in a logical 0 state.

In some embodiments the first CPU core 108 may read the status of each input and an output of the first input/output element 110 one at a time. Hence, the first CPU core 108 may first read the value of the first data contact 116 and then read the value of the first timing contact 118 or vice versa.

When the first CPU core 108 is aware of the status of the first data contact 116 and the status of the first timing contact 118 the first CPU core 108 may examine whether the data connection 302 between the first controller 102 and the second controller 202 is free. In some example embodiments when either of the first data contact 116 or the first timing contact 118 is not in a logical 1 state, it can be deduced that the data connection 302 is occupied by the other entity.

If the first CPU core 108 determines that the data connection 302 is occupied, the first CPU core 108 examines 904 if the second controller 202 is sending a start bit. If either of the first data contact 116 or the first timing contact 118 is in the logical 0 state it may be determined that the second controller 202 is sending a start bit or some other information. On the other hand, if it is determined in block 904 that both the first data contact 116 and the first timing contact 118 are in the logical 1 state it may be that the second controller 202 is not sending any information. Hence, the first controller 102 may examine 918 if the first data contact 116 and the first timing contact 118 have remained in the logical 1 state long enough to determine that the second controller 202 is not sending anything at the data connection 302. If the examination in block 918 indicates that the first data contact 116 and the first timing contact 118 have remained in the logical 1 state a certain time the first controller 102 may begin preparations for transmitting a start bit. Thus, the operation may continue to block 906. If the examination in block 918 indicates that the first data contact 116 and/or the first timing contact 118 have not remained in the logical 1 state a certain time the first controller 102 may examine 920 whether the start bit arbitration is to be aborted, or the first controller 102 may go back to block 904 to examine the status of the first data contact 116 and the first timing contact 118.

Figure 9:
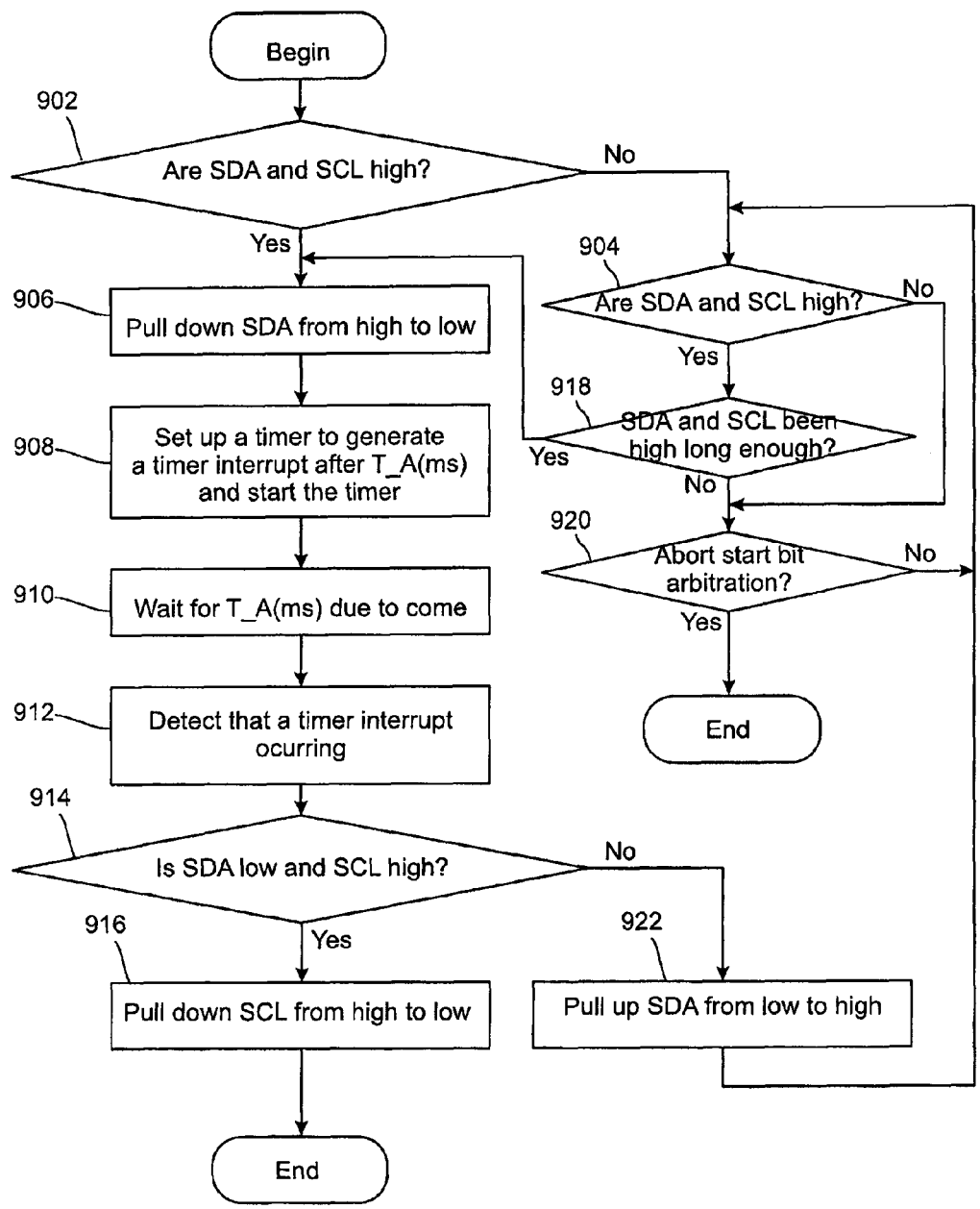
FIG. 9 is a flow diagram of an example of a method in a first communication element according to an example embodiment of the present invention.
Figure 10:
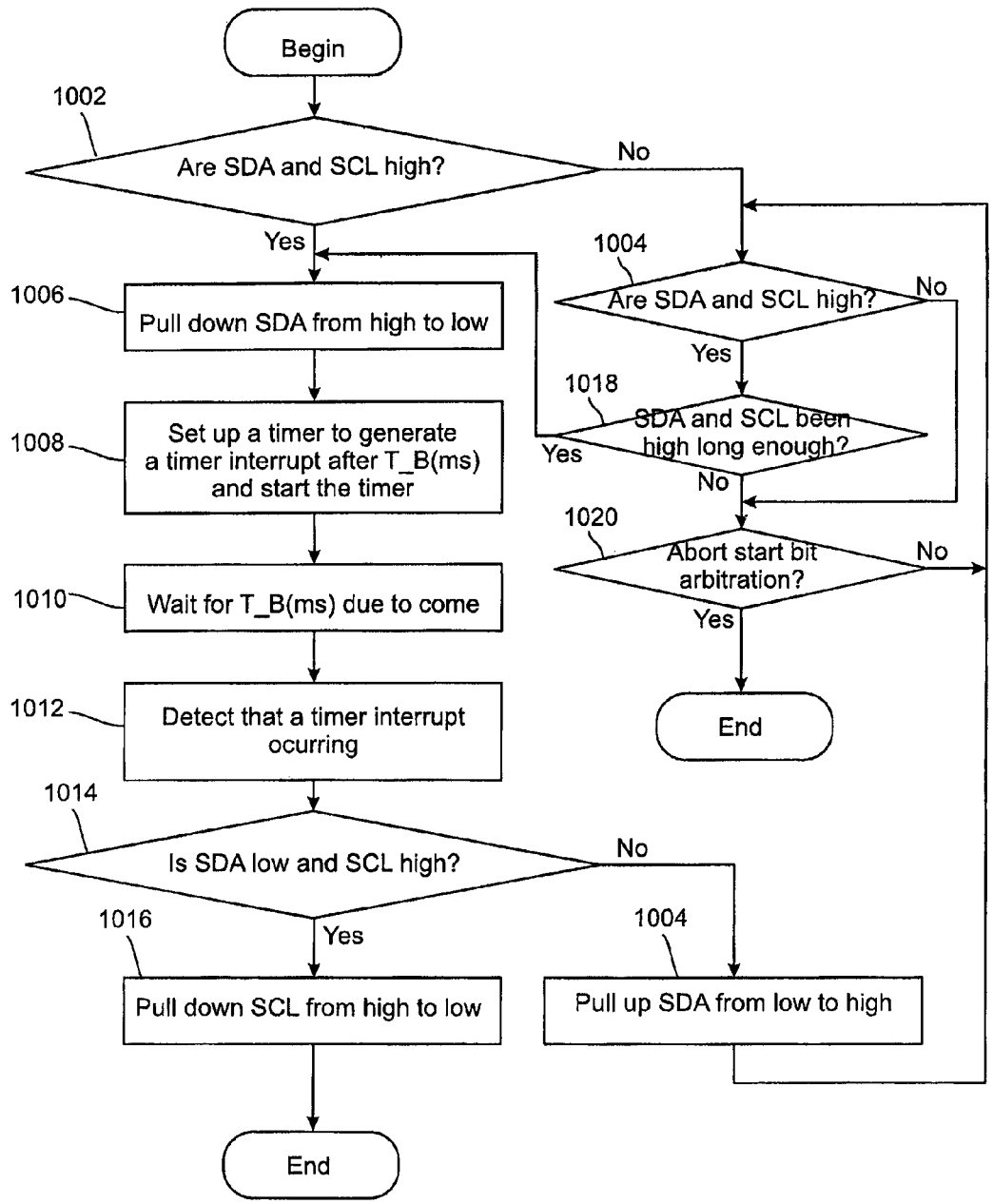
FIG. 10 is a flow diagram of an example of a method in a second communication element according to an example embodiment of the present invention.

Although FIG. 9 illustrates that the start bit arbitration may be aborted after blocks 904 or 920, there may be different and/or additional locations to abort the start bit arbitration.

Otherwise, if the first CPU core 108 determines that the data connection 302 is not occupied, the first CPU core 108 sets 906 the first data contact 116 into the logical 0 state. The first CPU core 108 also sets up a timer 120 to generate a timer interrupt after a first period of time T_A(ms) and starts the timer 120 (block 908). The first period of time may also be called as a first arbitration delay. When the timer has counted 910 the first period of time T_A(ms), an interrupt may be generated which is detected 912 by the first interrupt module 112. The interrupt module 112 informs the first CPU core 108 that the timer has counted the first period of time wherein the first CPU core 108 examines 914 the status of the first data contact 116 and the status of the first timing contact 118. If the first data contact 116 is in the logical 0 state and the first timing contact 118 is in a logical 1 state, it can be deduced that the data connection 302 is not occupied by the other entity or entities. Then, the first CPU core 108 may change 916 the timing contact 118 from the high level to the low level to initiate the transmission of the start bit. Otherwise, if the first CPU core 108 determines in block 914 that the first data contact 116 is not in the logical 0 state or the first timing contact 118 is not in the logical 1 state the procedure may continue by setting the first data contact into the high level by the first CPU core 108 to abort the transmission of the start bit and examining 904 if the second controller 202 is sending a start bit.

Figure 2:
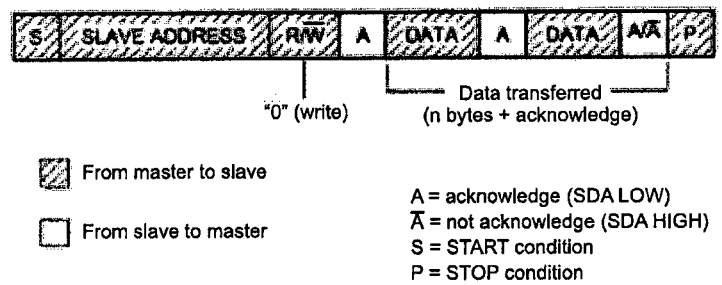
FIG. 2 depicts an example of a packet according to an example protocol for transmitting data from a master communication element to a slave communication element.
Figure 3:
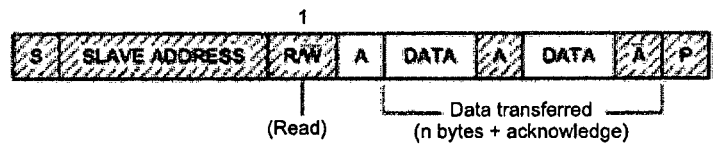
FIG. 3 depicts an example of a packet according to an example protocol for receiving data from a slave communication element by a master communication element.
Figure 4:
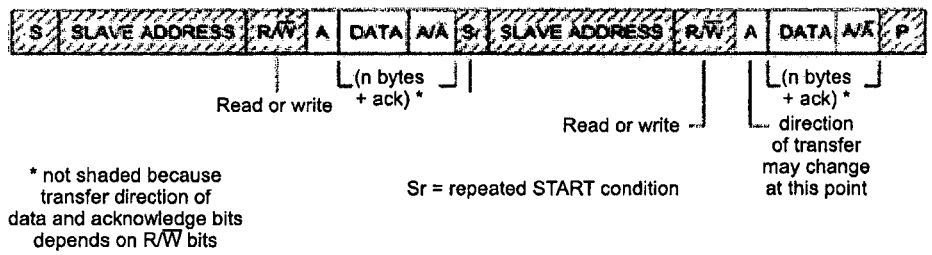
FIG. 4 depicts an example of a packet according to an example protocol for transmitting and receiving data by a master communication element to another communication element.

When the first CPU core 108 has managed to send the start bit it may continue sending other parts of a data packet according to a protocol as well. Some non-limiting examples of packet structures are depicted in FIGS. 2-4. The other parts of the packet may include a receiver address, a read/write indication, a first acknowledgement, data bits (payload), a second acknowledgement, and a stop bit. In some embodiments a multiple of packets may be transmitted by replacing all the other stop bits except the last stop bit with a repeated start bit and repeating the packet structure for each of the multiple of the packets. In the example of FIG. 4 two packets are combined into one transmission stream.

Figure 5:
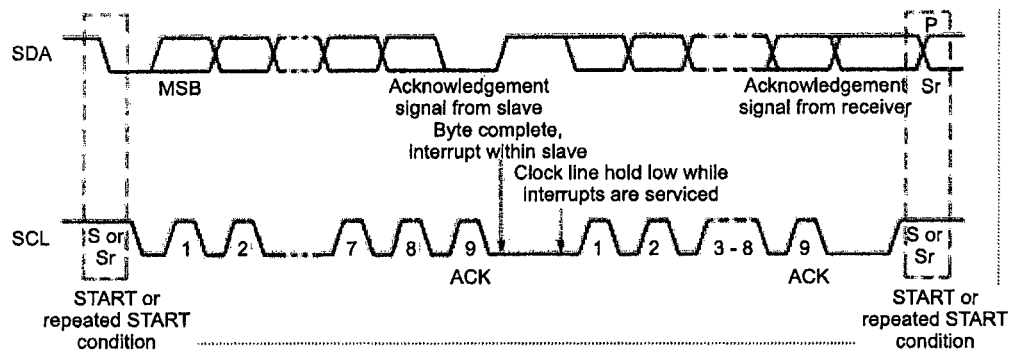
FIG. 5 depicts an example of a packet according to an example data transfer protocol for transmitting and receiving data in a data connection.

The transmission of the bits of the packet(s) may be performed as follows. When the start bit has been transmitted (i.e. setting the first data contact 116 into the logical 0 state and after a certain period of time setting the first timing contact 118 into the logical 0 state) the bits of the packet may be transmitted by setting the first data contact 116 to correspond the value of the bit to be transmitted. For example, if the bit to be transmitted is 0 the first data contact 116 may be set to the logical 0 state and if the bit to be transmitted is 1 the first data contact 116 may be set to the logical 1 state or vice versa. When the first data contact 116 is set to the desired value the first timing contact 118 may be set to the logical 1 state for a while. In other words, a pulse may occur on the first timing contact 118 during which the first data contact 116 remains in the value representing the bit to be transmitted. The receiving entity (the second CPU core 208 in this example) may then examine the status of the second data contact 216 when the second timing contact 218 is in the logical 1 state to determine the value of the current bit. FIG. 5 illustrates an example of this kind of data transfer protocol.

In some other embodiments one bit may be transmitted at each edge of the first timing contact 118 i.e. when the status of the first timing contact 118 changes from logical 0 to logical 1 or from logical 1 to logical 0, one data bit may be transmitted, excluding the edges occurring in the first timing contact 118 during the transmission of the start and stop bits.

Figure 6:
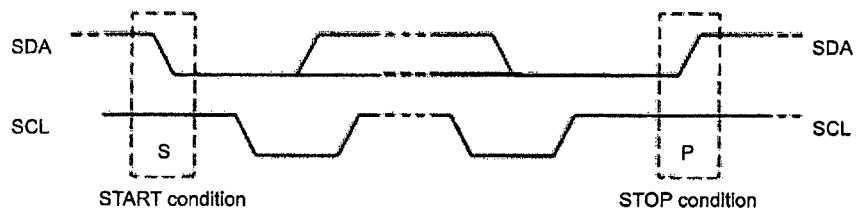
FIG. 6 depicts an example of a structure of start and stop bits of an example protocol for a data connection.

FIG. 6 illustrates the levels of the first data contact 116 and the second data contact 118 during the transmission of the start condition (start bit) and the stop condition (stop bit).

Figure 7:
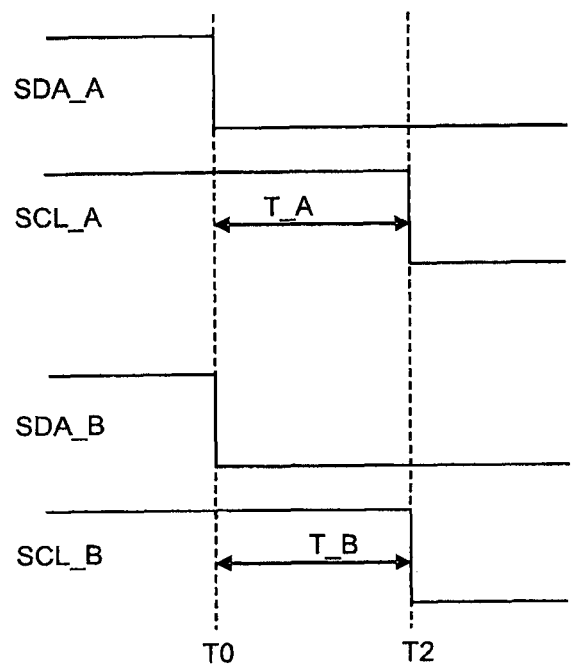
FIG. 7 depicts an example of a situation in which two communication elements simultaneously try to start transmission to a data connection.
Figure 8:
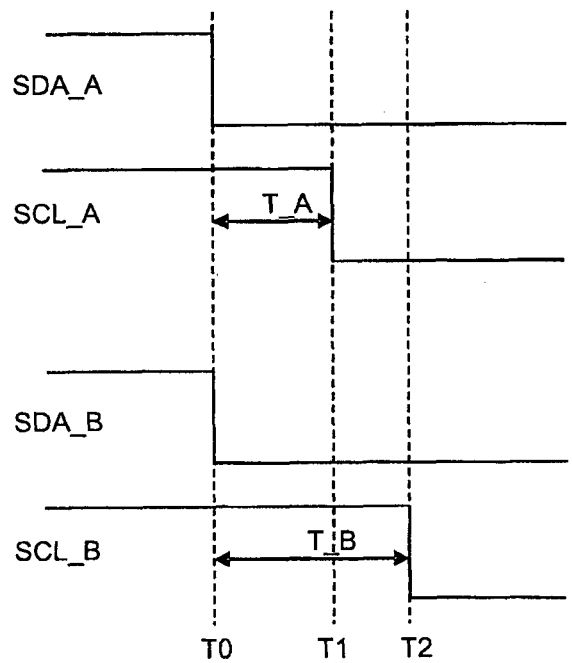
FIG. 8 depicts an example of a situation in which two communication elements simultaneously try to start transmission to a data connection and how the situation can be solved according to an example embodiment of the present invention.

It should be noted here that the above example was describing the operation at the first controller 102 using the first data contact 116 and the second data contact 118 but the second controller 202 may operate in a similar way except that the arbitration delay is different from the arbitration delay of the first controller 102. In other words, the second CPU core 208 may set up a second timer 220 to generate an interrupt after a second period of time T_B(ms) which is different from the first period of time T_A(ms). This enables the system to handle situations in which both the first controller 102 and the second controller 202 simultaneously try to send the start bit. This may happen because, as can be seen from the flow diagrams in FIGS. 9 and 10, the first CPU core 108 may determine in block 902 that the data connection 302 is free and the second CPU core 208 may also determine in block 1004 that the data connection 302 is free. The first CPU core 108 then proceeds to block 906 and sets the first data contact 116 into the logical 0 state. Correspondingly, the second CPU core 208 may proceed to block 1006 and sets the second data contact 216 into the logical 0 state. This situation is illustrated in FIGS. 7 and 8. As can be seen from these Figures, the first controller 102 sets the first data contact 116 to the logical 1 state at the same time when the second controller 202 sets the second data contact 216 to the logical 1 state. Because the first data contact 116 and the second data contact 216 are connected with wiring (the data connection 302) together (or by optical means), both entities may not simultaneously transmit data via the data connection 302.

Now, if both the first controller 102 and the second controller 202 used the same arbitration delay as is illustrated in FIG. 7, the first CPU core 108 would determine in block 914 that the first data contact 116 is in the logical 0 state and the first timing contact 118 is in a logical 1 state.

Also the second CPU core 208 would determine in block 1014 that the second data contact 216 is in the logical 0 state and the second timing contact 218 is in a logical 1 state. Hence, both the first controller 102 and the second controller 202 would continue the data transmission thus causing a collision on the data connection 302.

FIG. 8 illustrates a situation in which the second arbitration delay T_B is different (longer in this example) than the first arbitration delay T_A. Hence, the first CPU core 108 would enter the operation of the block 914 earlier than the second CPU core 208 enters the operation of the block 1014 and manages to set the first timing contact 118 to the logical 0 state. When the second CPU core 208 enters the operation of the block 1014 it may detect that, although the second data contact 216 may be in the logical 0 state, the second timing contact 218 is not in the logical 1 state. Therefore, the operation of the second CPU core 208 may continue to block 1004 to abort the start bit transmission and to begin monitoring the status of the data connection 302.

The monitoring of the status of the data connection 302 by the first CPU core 108 in block 904 may comprise examining the status of the first data contact 116 and the first timing contact 118. When the first CPU core 108 has determined that both the first data contact 116 and the first timing contact 118 has continuously remained in the logical 1 state a certain period of time (block 918) the first CPU core 108 may determine that the second controller 202 has stopped transmission in the data connection 302. Respectively, the second CPU core 208 may examine in block 1004 the status of the second data contact 216 and the second timing contact 218. When the second CPU core 208 has determined in block 1018 that both the second data contact 216 and the second timing contact 218 has continuously remained in the logical 1 state a certain period of time the second CPU core 208 may determine that the first controller 102 has stopped transmission in the data connection 302.

When either of the controllers 102, 202 is transmitting data via the data connection 302 to the other controller, the receiving controller may receive the data e.g. as follows. For example, if the first controller 102 is transmitting data the first CPU core 108 commands the first input/output element 110 to set the status of the first data contact 116 to correspond with the value of the bit to be transmitted and to output a pulse in the first timing contact 118. The second CPU core 208 reads e.g. by using the second input/output element 210 the status of the second timing contact 218. When the second timing contact 218 is in the logical 1 state the second CPU core 208 may read, e.g. by using the second input/output element 210, the status of the second data contact 216 and use this value as the value of the current bit. The second CPU core 208 may then read the value of the second timing contact 218 until it has changed to logical 1 again (having been in logical 0 state in between) and use the status of the second data contact 218 as the value of the next bit. Receiving of data bits may continue until the second CPU core 208 detects a stop condition or a repeated start condition.

An example of the stop condition is that there is no more data to be transmitted, or that an error has been detected. For example, the receiving part (e.g. the second controller 202) may have detected an error in the received data and transmitted a negative acknowledgement as a response to the transmitting part (e.g. the first controller 102). The transmitting part may then retransmit the data or abort the transmission. There may also be other situations in which the stop condition may exist.

The repeated start condition may exist, for example, when there is more data to be transmitted that can be transmitted in one packet. In such a case the transmission of one packet is not ended with the stop bit but a repeated start bit after which the data transmission can be continued. There may also be other situations in which the repeated start condition may exist.

It should be noted here that the direction of the transfer of data may change. For example, the packet may contain an indication (Read/Write) which tells the receiving entity whether it should receive data bits or whether it should prepare transmit data. For example, in the example of FIG. 4 the first controller 102 may transmit the start bit, the slave address (if any) and the read/write bit and the second controller 202 may reply by sending the first acknowledgement bit and the data bits, if the value of the read/write bit indicated that the first controller 102 wants to read data from the second controller 202.

In some example embodiments the stop condition and the repeated start condition may be detected when the status of the first/second data contact 116, 216 changes while the status of the first/second timing contact 118, 218 is the logical 1 state as can be seen from FIG. 6.

The initiation of the start bit arbitration process described above may arise e.g. when the first controller 102 or the second controller 202 has data to be transmitted to the other entity. For example, an application program running under the control of the first controller 102 or the second controller 202 may generate some data to be transmitted to the other entity.

The entity which first has access to the data connection 302 i.e. manages to send the start bit may become a master device and the other entity or entities may then become a slave device or devices. The master device controls the writing data to the data connection 302 and reading data from the data connection 302.

In some embodiment the system may comprise two controllers connected as a peer-to-peer connection. Hence, device addresses may not be needed thus a simpler packet structure without address fields may be used.

The arbitration delay values may be used to prioritize entities of the system. For example, those entities with shorter arbitration delay have priority of gaining control of START bit compared to entities having longer arbitration delays.

Furthermore, system adopting embodiments of the present invention may consume less power, may have less hardware circuits and may have added time efficiency. Implementations utilizing embodiments of the present invention may be more feasible by making more of input/output elements, apparatuses abundant in many CPUs.

In some embodiments the monitoring state may be something like that, if there is any logic level change of the timing contact 118, 218 that marking the start of next data bit, the monitoring CPU core 108, 208 may begin to check the logic level of data contact 116, 216 and store the logic level as one data bit. From bit to bit can data sequence be received into monitoring CPUs via two input/output elements 110, 210.

Furthermore, the interrupt timer may not be needed, because it is only one way of measuring the arbitration delays T_A or T_B, but a looping mode could also be used in which CPU core 108, 208 keeps querying if the counter of the timer is due to the counter number set previously.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of exemplary embodiments of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some example embodiments will be provided.

According to some example embodiments there is provided a method comprising:
  detecting a status of a first contact;
  detecting a status of a second contact;
  using the detected status of the first contact and the detected status of the second contact to determine whether the first contact is free for transferring data;
  if it is determined that the data connection is free for transferring data, waiting for a first arbitration delay;
  after the first arbitration delay detecting the status of the first contact and detecting the status of the second contact; and
  beginning a transmission of a start bit if the detected status of the first contact and the detected status of the second contact indicate that the first contact is free for transferring data.

In some embodiments the method comprises using the first contact as a first data contact; and using the second contact as a first timing contact.

In some embodiments the method comprises using an input/output line of a first controller as the first data contact; and using another input/output line of the first controller as the first timing contact.

In some embodiments the method comprises using an input/output line of a second controller as a second data contact; and using another input/output line of the second controller as a second timing contact.

In some embodiments the method comprises providing a second arbitration delay in the second controller different from the first arbitration delay.

In some embodiments the method comprises setting the first data contact from a first state into a second state if it is determined that the data connection is free for transferring data.

In some embodiments the method comprises, at the beginning a transmission of a start bit, setting the second data contact from the first state into the second state.

In some embodiments the first state is a logical 1 state and the second state is a logical 0 state.

In some embodiments the method comprises using a timer to measure the first arbitration delay.

In some embodiments the method comprises generating an interrupt by the timer after the first arbitration delay to initiate detecting the status of the first contact and detecting the status of the second contact.

According to some example embodiments there is provided an apparatus comprising at least one processor and at least one memory including computer program code, the at least one memory and the computer program code configured to, with the at least one processor, cause the apparatus to:
  detect a status of a first contact;
  detect a status of a second contact;
  use the detected status of the first contact and the detected status of the second contact to determine whether the first contact is free for transferring data;
  wait for a first arbitration delay, if it is determined that the data connection is free for transferring data;
  detect the status of the first contact and detect the status of the second contact after the first arbitration delay; and
  begin a transmission of a start bit if the detected status of the first contact and the detected status of the second contact indicate that the first contact is free for transferring data.

In some embodiments said at least one memory is stored with code thereon, which when executed by said at least one processor, further causes the apparatus to use the first contact as a first data contact; and using the second contact as a first timing contact.

In some embodiments said at least one memory is stored with code thereon, which when executed by said at least one processor, further causes the apparatus to use an input/output line of a first controller as the first data contact; and to use another input/output line of the first controller as the first timing contact.

In some embodiments said at least one memory is stored with code thereon, which when executed by said at least one processor, further causes the apparatus to use an input/output line of a second controller as a second data contact; and to use another input/output line of the second controller as a second timing contact.

In some embodiments said at least one memory is stored with code thereon, which when executed by said at least one processor, further causes the apparatus to provide a second arbitration delay in the second controller different from the first arbitration delay.

In some embodiments said at least one memory is stored with code thereon, which when executed by said at least one processor, further causes the apparatus to set the first data contact from a first state into a second state if it is determined that the data connection is free for transferring data.

In some embodiments the beginning a transmission of a start bit comprises code, which when executed by said at least one processor, further causes the apparatus to set the second data contact from the first state into the second state.

In some embodiments the first state is a logical 1 state and the second state is a logical 0 state.

In some embodiments said at least one memory is stored with code thereon, which when executed by said at least one processor, further causes the apparatus to use a timer to measure the first arbitration delay.

In some embodiments said at least one memory is stored with code thereon, which when executed by said at least one processor, further causes the apparatus to generate an interrupt by the timer after the first arbitration delay to initiate detecting the status of the first contact and detecting the status of the second contact.

In some embodiments the apparatus is a component of a mobile terminal.

According to some example embodiments there is provided a storage medium having stored thereon a computer executable program code for use by an apparatus, said program code comprises instructions for:
  detecting a status of a first contact;
  detecting a status of a second contact;
  using the detected status of the first contact and the detected status of the second contact to determine whether the first contact is free for transferring data;
  if it is determined that the data connection is free for transferring data, waiting for a first arbitration delay;
  after the first arbitration delay detecting the status of the first contact and detecting the status of the second contact; and
beginning a transmission of a start bit if the detected status of the first contact and the detected status of the second contact indicate that the first contact is free for transferring data.

In some embodiments said program code comprises instructions for using the first contact as a first data contact; and using the second contact as a first timing contact.

In some embodiments said program code comprises instructions for using an input/output line of a first controller as the first data contact; and for using another input/output line of the first controller as the first timing contact.

In some embodiments said program code comprises instructions for using an input/output line of a second controller as a second data contact; and for using another input/output line of the second controller as a second timing contact.

In some embodiments said program code comprises instructions for providing a second arbitration delay in the second controller different from the first arbitration delay.

In some embodiments said program code comprises instructions for setting the first data contact from a first state into a second state if it is determined that the data connection is free for transferring data.

In some embodiments the beginning a transmission of a start bit comprises instructions for setting the second data contact from the first state into the second state.

In some embodiments the first state is a logical 1 state and the second state is a logical 0 state.

In some embodiments said program code comprises instructions for using a timer to measure the first arbitration delay.

In some embodiments said program code comprises instructions for generating an interrupt by the timer after the first arbitration delay to initiate detecting the status of the first contact and detecting the status of the second contact.

According to some example embodiments there is provided an apparatus comprising:
  a first detector adapted to detect a status of a first contact;
  a second detector adapted to detect a status of a second contact;
  a determining element adapted to use the detected status of the first contact and the detected status of the second contact to determine whether the first contact is free for transferring data;
  a timer to generate a first arbitration delay when the determining element determined that the data connection is free for transferring data;
  wherein the first detector is adapted to detect the status of the first contact and the second detector is adapted to detect the status of the second contact after the first arbitration delay has elapsed; and
  the apparatus is adapted to begin a transmission of a start bit if the detected status of the first contact and the detected status of the second contact indicated that the first contact is free for transferring data.

In some embodiments the apparatus is a component of a mobile terminal.

According to some example embodiments there is provided an apparatus comprising:
  means for detecting a status of a first contact;
  means for detecting a status of a second contact;
  means for using the detected status of the first contact and the detected status of the second contact to determine whether the first contact is free for transferring data;
  means for waiting for a first arbitration delay, if it is determined that the data connection is free for transferring data;
  wherein the means for detecting the status of the first contact and the means for detecting the status of the second contact are adapted to detect the status of the first contact and the status of the second contact after the first arbitration delay; and
means for beginning a transmission of a start bit if the detected status of the first contact and the detected status of the second contact indicate that the first contact is free for transferring data.

In some embodiments the apparatus comprises means for using the first contact as a first data contact; and means for using the second contact as a first timing contact.

In some embodiments the apparatus comprises means for using an input/output line of a first controller as the first data contact; and means for using another input/output line of the first controller as the first timing contact.

According to some example embodiments there is provided a computer program product including one or more sequences of one or more instructions which, when executed by one or more processors, cause an apparatus to at least perform the following:

detecting a status of a first contact;
detecting a status of a second contact;
using the detected status of the first contact and the detected status of the second contact to determine whether the first contact is free for transferring data;
if it is determined that the data connection is free for transferring data, waiting for a first arbitration delay;
after the first arbitration delay detecting the status of the first contact and detecting the status of the second contact; and beginning a transmission of a start bit if the detected status of the first contact and the detected status of the second contact indicate that the first contact is free for transferring data.

In some embodiments of the computer program product said program code comprises instructions for using the first contact as a first data contact; and using the second contact as a first timing contact.

In some embodiments of the computer program product said program code comprises instructions for using an input/output line of a first controller as the first data contact; and for using another input/output line of the first controller as the first timing contact.

In some embodiments of the computer program product said program code comprises instructions for using an input/output line of a second controller as a second data contact; and for using another input/output line of the second controller as a second timing contact.

In some embodiments of the computer program product said program code comprises instructions for providing a second arbitration delay in the second controller different from the first arbitration delay.

In some embodiments of the computer program product said program code comprises instructions for setting the first data contact from a first state into a second state if it is determined that the data connection is free for transferring data.

In some embodiments of the computer program product the beginning a transmission of a start bit comprises instructions for setting the second data contact from the first state into the second state.

In some embodiments of the computer program product the first state is a logical 1 state and the second state is a logical 0 state.

In some embodiments of the computer program product said program code comprises instructions for using a timer to measure the first arbitration delay.

In some embodiments of the computer program product said program code comprises instructions for generating an interrupt by the timer after the first arbitration delay to initiate detecting the status of the first contact and detecting the status of the second contact.

The invention claimed is:

1. A method comprising:
    detecting a status of a first contact of a first controller, wherein the first contact is a data contact for serial data transfer;
    detecting a status of a second contact of the first controller, wherein the second contact is a timing contact for providing timing information for the serial data transfer;
    using the detected status of the first contact and the detected status of the second contact to determine whether the first contact is free for transferring data;
    if it is determined that the first contact is free for transferring data, waiting for a first arbitration delay;
    after the first arbitration delay detecting the status of the first contact and detecting the status of the second contact; and
    beginning a transmission of a start bit if the detected status of the first contact and the detected status of the second contact did not change during the first arbitration delay.

2. The method according to claim 1, wherein the first contact is connected with a corresponding data contact of a second controller; and wherein the second contact is connected with a corresponding timing contact of the second controller.

3. The method according to claim 2, wherein the first arbitration delay is different than a second arbitration delay that is used by the second controller.

4. The method according to claim 1, further comprising changing the first contact from a first state to a second state if it is determined that the data connection is free for transferring data.

5. The method according to claim 2, wherein the beginning a transmission of a start bit comprises changing the corresponding data contact from the first state to the second state.

6. The method according to claim 4, wherein the first state is a logical 1 state and the second state is a logical 0 state.

7. The method according to claim 1 comprising using a timer to measure the first arbitration delay.

8. An apparatus comprising at least one processor and at least one memory including computer program code, the at least one memory and the computer program code configured to, with the at least one processor, cause the apparatus to:
    detect a status of a first contact of a first controller, wherein the first contact is a data contact for serial data transfer;
    detect a status of a second contact of the first controller, wherein the second contact is a timing contact for providing timing information for the serial data transfer;
    use the detected status of the first contact and the detected status of the second contact to determine whether the first contact is free for transferring data;
    wait for a first arbitration delay, if it is determined that the first contact is free for transferring data;
    detect the status of the first contact and detect the status of the second contact after the first arbitration delay; and
    begin a transmission of a start bit if the detected status of the first contact and the detected status of the second contact did not change during the first arbitration delay.

9. The apparatus according to claim 8, wherein the first contact is connected to a corresponding data contact of a second controller; and wherein the second contact is connected with a corresponding timing contact of the second controller.

10. The apparatus according to claim 9, wherein the first arbitration delay is different than a second arbitration delay that is used by the second controller.

11. The apparatus according to claim 8, wherein the at least one memory stored with code thereon, which when executed by said at least one processor, further causes the apparatus to change the first data contact from a first state to a second state if it is determined that the data connection is free for transferring data.

12. The apparatus according to claim 9, wherein the beginning a transmission of a start bit comprising code, which when executed by said at least one processor, further causes the apparatus to change the corresponding data contact from the first state to the second state.

13. The apparatus according to claim 11, wherein the first state is a logical 1 state and the second state is a logical 0 state.

14. The apparatus according to claim 8, said at least one memory stored with code thereon, which when executed by said at least one processor, further causes the apparatus to use a timer to measure the first arbitration delay.

15. The apparatus according to claim 14, said at least one memory stored with code thereon, which when executed by said at least one processor, further causes the apparatus to generate an interrupt by the timer after the first arbitration delay to initiate detecting the status of the first contact and detecting the status of the second contact.

16. The apparatus according to claim 8, wherein the apparatus is a component of a mobile terminal.

17. The method according to claim 1, wherein the beginning a transmission of a start bit comprises changing the second contact from a first state to a second state.

18. The method of claim 4, the method further comprising:
   if the detected status of at least one of the first contact and the second contact changed during the first arbitration delay;
   setting the status of the first contact to the first state.

19. The method of claim 7, further comprising:
   generating an interrupt by the timer after the first arbitration delay to initiate detecting the status of the first contact and detecting the status of the second contact.

20. The apparatus of claim 8, wherein the beginning a transmission of a start bit comprising code, which when executed by said at least one processor, further causes the apparatus to change the second contact from a first state to a second state.

* * * * *